Feb. 21, 1950
J. H. McCULLEY
2,497,954
METHOD FOR REMOVING EMULSIFYING AGENTS
FROM AMINE SOLUTION
Filed Oct. 3, 1947
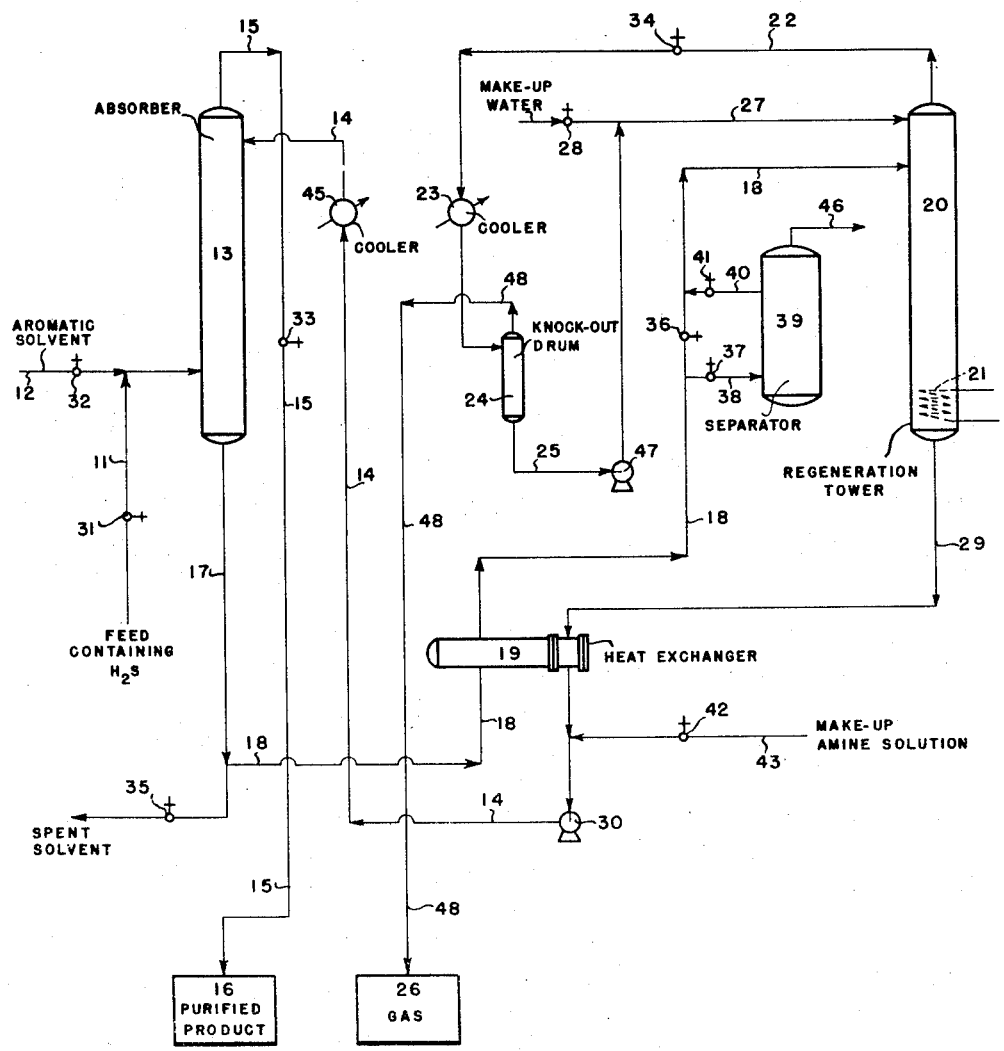
John H. McCulley, INVENTOR.
BY
J. D. McLean
ATTORNEY Patented Feb. 21, 1950

2,497,954

UNITED STATES PATENT OFFICE 2,497,954

METHOD FOR REMOVING EMULSIFYING AGENTS FROM AMINE SOLUTION

John H. McCulley, Baytown, Tex., assignor, by mesne assignments, to Standard Oil Development Company, Elizabeth, N. J., a corporation of Delaware Application October 3, 1947, Serial No. 777,835

8 Claims. (Cl. 196—32)

1

The present invention is directed to an improved method for removing acidic gases from fluids containing them. More particularly, the invention is concerned with a method for removing emulsifying agents from solutions which are employed in treating acid-containing fluids such as liquids or gases. In its more specific aspects, the invention relates to a method for treating an amine solution to remove contaminating bodies therefrom which cause emulsification thereof.

Prior to the present invention it has been known to treat gases and liquids such as mixtures of gases including carbon dioxide and hydrogen sulfide and light hydrocarbons such as butane, propane, ethane, methane, and the like with amine solutions such as monoethanolamine and triethanolamine to remove acidic gases such as carbon dioxide and hydrogen sulfide. The amine usually contacts gases and liquids as an aqueous solution containing approximately from 10 to 30% of the particular amine in an absorber tower with the aqueous amine solution contacting the acidic fluid countercurrently. Usually the absorption tower is equipped with contacting means such as bubble cap plates or packing or any other material which will insure good contact between gases and liquids or between liquids and liquids. The purified gas or liquid, free of acidic bodies, passes through and out of the absorber while the acidic contaminants are absorbed in the amine solution. The amine solution is removed from the absorber, heated, and introduced into a tower where it is subjected to stripping in the presence of steam, the steam being generated in situ by heating of the aqueous solution. The steam effectively removes the acidic bodies which are released from the regeneration tower. After the amine solution has been freed of the contaminants, it may be reused in the process. The water which is released as steam is condensed and returned to the regenerating tower in which the contaminants are released from the amine solution to maintain the solution at its original strength and to provide reflux. The operation is usually conducted with very little, if any, amine solution required as makeup and the only loss being that due to entrainment. When makeup is required, fresh amine solution may be added.

There is one objection to this process in that the amine solution, after being used for long periods of time, becomes contaminated with materials which form emulsions between the fluid being treated and the amine. These emulsions cause serious losses in capacity. For example, after approximately 2 months' operation, a commercial unit having an initial capacity of 4000 barrels per day of a feed mixture of propane and propylene was reduced in capacity to 2500 barrels per day due to formation of emulsions. The amount of amine solution had been reduced from 2500 barrels per day to 1500 barrels per day. The contaminating bodies are believed to be formed from organic contaminants contained in the feed mixture such as objectionable unsaturated hydrocarbons, organic acids, and the like which may be polymerized by or form salts with the solution. These polymerized or salt-like bodies become admixed with inorganic compounds such as iron sulfide which may be present in the vessels by reaction of sulfur with iron or with elemental carbon which is usually present in petroleum refining equipment. As a result, a heterogeneous mixture of organic salts, polymers, inorganic metal compounds, and carbonaceous material may form which tend to stabilize the emulsions resulting from the contact of the amine solution with the hydrocarbon fluids. Thus, the capacity of a commercial unit may be seriously affected as illustrated before.

It is, therefore, the main object of my invention to provide a process for removing emulsion-forming materials from amine solutions used to treat acidic fluids such as carbon dioxide and hydrogen sulfide-containing gases or liquid hydrocarbons.

Another object of the invention is to provide a method of operating a process so that emulsion difficulties resulting from the contact of aqueous amine solutions with hydrocarbon fluids does not result.

A still further object of the present invention is to provide a method for treating an amine solution to remove emulsion-forming bodies.

I have now discovered that amine solutions which tend to form stable emulsions may be treated with an aromatic hydrocarbon solvent to remove the emulsion stabilizing materials. It has been found that by treating these amine solutions such as monoethanolamine, diethanolamine and triethanolamine with aromatics boiling in the range from about 175° F. up to about 600° F., the emulsion stabilizing materials may be substantially removed and the amine solution placed in condition for further use in the process without loss in operating capacity.

The objects of the present invention may be achieved by treating an amine solution with an aromatic hydrocarbon or an aromatic hydrocarbon-containing mixture under conditions substantially to remove the emulsion stabilizing constituents or the objects may be achieved by circulating in the system with the amine solution during removal of acidic bodies from hydrocarbon fluids an aromatic hydrocarbon or an aromatic-containing hydrocarbon to cause selective removal of the contaminating bodies which tend to stabilize the emulsion.

The invention will be described briefly as involving the contacting of a feed hydrocarbon mixture containing an acidic gas such as carbon dioxide or hydrogen sulfide either in the gaseous or liquid phase with an aqueous amine solution of the type mentioned before to cause selective absorption of hydrogen sulfide or carbon dioxide from the hydrocarbon, thus leaving the hydrocarbon substantially free of these materials and suitable for use in petroleum refining processes such as catalytic conversion operations as illustrated by polymerization processes and the like. The amine solution is then heated to a temperature to cause the release of the acidic bodies by the action of steam generated in situ. The acidic gases and water removed from the amine solution are separated, the water returned to the amine solution, and the acidic gases discarded from the process.

As the amine solution circulates, reaction products of organic acids with the amine solution, polymerized bodies resulting from polymerization of unsaturated hydrocarbons, carbonaceous material, iron sulfide, and the like accumulate in the aqueous amine solution. After this material has accumulated to the extent that the emulsion is stabilized, contact of the amine solution with the acid-containing fluid is interrupted and an aromatic hydrocarbon or an aromatic-containing hydrocarbon mixture is substituted for the acid containing feed fluid and the aromatic solvent circulates through the system for a time sufficient to allow removal of the emulsion stabilizing component. Usually circulation to allow from about 3 to 6 contacts of the aqueous amine solution with the aromatic hydrocarbon should be sufficient. Following the contacts, the amine is allowed to separate from the aromatic hydrocarbon and the aromatic hydrocarbon removed from the system and replaced by the acid-containing feed hydrocarbon and the process continues until the concentration of emulsion stabilizer builds up again to the point where it seriously impairs operational capacity.

The invention also involves the continuous injection of a small quanity of aromatic hydrocarbon which contacts the amine solution countercurrently as it contacts the acid-containing feed mixture. Under these conditions, the aromatic hydrocarbon solvent is introduced preferably with a gaseous feed, flowed through the absorption tower, contacts the aqueous amine solution countercurrently, and is routed into a separator which is of sufficient capacity to allow a separation between the aqueous solution and the aromatic hydrocarbon with the aromatic hydrocarbon being removed and the amine routed to a tower where it is subjected to heating to allow stripping of the absorbed acidic material.

The aromatic hydrocarbon which may be used in the present process may be a pure aromatic hydrocarbon such as illustrated by toluene, xylene, and the higher members of the same homologous series. Benzene, by having a lower boiling point, is not a preferred aromatic to be employed in the practice of the present invention. However, it may be used suitably in admixture with higher boiling aromatics and other hydrocarbons. The aromatic-containing hydrocarbon may be a solvent extract of kerosene, for example, or it may be an aromatic-containing hydrocarbon produced by the so-called hydroforming process in which methylcyclohexane and dimethylcyclopentane are converted into the corresponding aromatics. The aromatic-containing hydrocarbon may also suitably be a heavy fraction produced by the catalytic cracking of gas oil. Such fractions boil from about 300° to about 450° F. and have a substantial content of aromatics and are eminently suitable in the practice of the present invention. A hydrocarbon fraction containing 50% or more of aromatics is suitable for use in the practice of the present invention. When aromatic-containing hydrocarbon mixtures are employed, it is preferred that the other hydrocarbons present in the aromatic-containing hydrocarbon be substantially unreactive under the conditions prevailing in the treatment of the amine solution.

The invention will now be further illustrated by reference to the drawing in which the sole figure illustrates a preferred mode of practicing the invention.

Referring now to the drawing, numeral 11 designates a charge line through which a feed hydrocarbon mixture, for example a mixture of propane and propylene containing hydrogen sulfide, is introduced into the system. Line 11 discharges into line 12 which introduces the feed into an absorption tower 13. Absorption tower 13 may be a conventional absorption tower equipped with bubble cap trays or it may be an absorption tower which is provided with a packing such as any one of the well known packings available to the industry. When gases comprise the feed mixture, the absorption tower will be preferentially provided with bubble cap trays while when a liquid fluid is the feed mixture, other packings of the types well known to the industry may be used. The feed hydrocarbon mixture introduced by line 12 into the absorber 13 flows upwardly therein and is countercurrently contacted with aqueous amine solutions such as diethanol amine in a concentration in water in the range between 10% and 30%, which is introduced by line 14. The aqueous amine solution flows countercurrently to the incoming feed, downwardly in absorber, and effectively removes carbon dioxide and hydrogen sulfide and allows the release of a substantially purified propane-propylene mixture by line 15 which discharges the purified product into a storage tank 16 for use as a feed stock, for example, in a thermal polymerization process.

The amine solution containing absorbed hydrogen sulfide and carbon dioxide or both of them dependent on the contaminants in the propane-propylene mixture is withdrawn from absorber 13 by line 17 and is routed by line 18 through a heat exchanger 19 to a regeneration tower 20 which is provided with an internal heating coil or an external reboiler as illustrated by heating means 21 to allow the adjustment of temperature and pressure and to cause release of the acid bodies absorbed from the incoming feed mixture. The application of heat by heating means 21 causes the aqueous amine solution to boil and release steam which effectively strips off the absorbed bodies and releases them through line 22. The effluent gases from regenerator 20 flows through condenser or cooler 23 and then into a knockout drum or trap 24. In drum 24 a separation is made between the acid gases, such as illustrated by hydrogen sulfide and carbon dioxide, and the water which is driven off from the amine solution in regenerator 20. The acid gases are released from the top of drum 24 by line 48 and are discharged into a tank 26 for further use or for release as may be desired.

The water condensed by cooling is passed through condenser 23, withdrawn from drum 24 by line 25, and is pumped by pump 47 to the top of absorber 20 by way of line 27 to allow maintenance of the amine solution as its desired concentration and also to provide reflux in separating the effluent gases from the amine solution. Make up water may be added by opening valve 28 in line 27. The regenerated amine solution is then returned to absorber 13 through line 29 which passes through heat exchanger 19 to give up its heat to the amine solution introduced into absorber 20. Line 29 terminates in pump 30 which then causes the regenerated amine solution to be pumped through line 14 and cooler 45 to the top of absorption tower 13. After a period of time, the solution circulating in the system as has been described may become contaminated with polymerized hydrocarbons, organic and inorganic reaction products and under these conditions the feed to the process is replaced by an aromatic hydrocarbon-containing mixture. The feed is terminated by closing valve 31 in line 11 and the aromatic hydrocarbon solvent, for example, a heavy fraction from a catalytic cracking operation containing approximately 60% aromatics, is introduced by opening valve 32 in line 12. The aromatic hydrocarbon solvent in an amount of approximately 20% based on the amine, is circulated through absorption tower 13 countercurrent to the amine solution introduced by line 14, valve 33 in line 15 being closed. The contaminated amine solution flows downwardly in absorber 13 and contacts countercurrently the aromatic solvent introduced by line 12, and the amine thoroughly admixed with the aromatic is withdrawn by line 17 and 18 and circulates through the absorption tower 20 and thence back through line 29, pump 30, and line 14, and again around through the system until the contaminants contained in the aqueous amine solution are substantially dissolved and/or suspended in the aromatic hydrocarbon. It will be understood, of course, during this circulation that valve 34 in line 22 will also be closed. After some 3 to 6 circulations of the aromatic and the aqueous amine solution through the absorber 13 and the regenerator 20, the flow of the amine solution is terminated by stopping pump 30. The amine and aromatic mixture is allowed to stand in absorber 13 and to separate into two phases. The aqueous amine solution, being heavier, will form the lower phase and the aromatic will form the upper phase. The amine solution, after separation, is then routed to the absorber 20 while the aromatic hydrocarbon solvent containing dissolved contaminating bodies which stabilize emulsions may be withdrawn after the amine solution has been withdrawn by opening valve 35 in line 17 to discharge the solvent for recovery of the aromatic for reuse in the process as desired.

As another embodiment, which may be used on a continuous scale, a small amount of the aromatic solution is continuously injected into the system through valve 32 and line 12 along with a gaseous feed hydrocarbon being introduced by line 11 and valve 31. Since during continuous injection of the aromatic hydrocarbon-containing solvent an appreciable quantity of this valuable material may be lost with the effluent gases through line 22, it will be desirable, under this mode of operation, to close valve 36 in line 10 and to open valve 37 in line 38 to allow the mixture of amine containing absorbed acid gases and aromatic hydrocarbon to discharge into a separator 39 which is of sufficient capacity to allow a separation by gravity of an aromatic layer and an aqueous amine layer. The aromatic layer containing dissolved organic and inorganic contaminants which tend to stabilize emulsions may be withdrawn by line 46 for recovery of the aromatic solvent for reuse in the process while the aqueous amine solution substantially free of bodies which cause stabilization of emulsions may be routed to absorber 20 by line 40 controlled by valve 41. This embodiment should be employed particularly with gaseous feeds unless provision is made for removing the aromatic hydrocarbon from the acid-free fluid.

To make up for the amine solution which may be carried out with the effluent gases in lines 15 and 22, respectively, from time to time it may be desirable to add aqueous amine to the system by opening valve 42 in line 43.

It will be seen from the foregoing description taken with the drawing that a process has been provided which is readily adaptable to existing equipment with only minor alterations.

In order to illustrate the invention further, an amine solution such as diethanolamine circulated in a process as described in conjunction with the drawing was treated with a heavy catalytic naphtha boiling in the range between 300° and 420° F. and containing 60% aromatic hydrocarbons. The amine solution was circulated through the absorber at a low rate until all of the solution had been contacted several times with the aromatic naphtha. The amine circulation was discontinued, the amine phase was released to the regenerator, and the aromatic naphtha was pumped out of the absorber. The feed hydrocarbon was then resumed to the absorber and it was found that the original capacity of the unit had been restored. The unit had an initial capacity of 4000 B/SD of feed hydrocarbon, which had dropped to 2500 B/SD. The initial circulation of the amine solution was 2500 B/SD, which had been reduced to 1500 B/SD, was resumed.

The amount of contaminating bodies is very small. For example, an analysis of the amine solution at the time the capacity had been reduced appreciably shows that it contained about 135 parts per million of finely divided solids. This material is appreciably soluble in aromatic hydrocarbons. Insoluble matter includes carbon and iron sulfide. It is believed that the solid materials become coated with fine particles of tar-like polymers which are effectively dissolved by the aromatic solvent and thus prevent the finely divided solids from acting as stabilizers of emulsions. This theory is tenable since the aromatic solvent does not dissolve the inorganic matter but may remove some of them by entrainment but it does dissolve the organic matter.

As illustrative that the solid particles are withdrawn in substantial amounts, a portion of diethanolamine was contacted with approximately 20% by volume of aromatic naphtha of the type illustrated. The organic components were soluble in the naphtha and the lower interfacial tension between the solids and the aromatic naphtha caused practically all of the solids to be drawn into the aromatic naphtha and thus discharge from the amine solution. Thus, it is evident that the amine solution may be substantially freed of both organic and inorganic constituents.

The conditions under which absorber 13 will operate will include a temperature in the range from about 60° F. to about 150° F. with a preferable temperature range from about 100° F. to about 110° F. Pressures will depend on whether or not liquid or gaseous phase contact of the fluids is desired. Thus, for gas phase contact of the acid containing fluids, pressures should be substantially atmospheric or slightly above atmospheric. For liquid phase conditions, higher pressures, sufficient to maintain a liquid phase will be required. For example, when a mixture of propane and propylene containing hydrogen sulfide and/or carbon dioxide is contacted in the liquid phase with diethanolamine a pressure of about 325 p. s. i. g. will be necessary.

Conditions in regenerator 20 should be sufficient to cause generation of steam for stripping the absorbed acid bodies from the enriched solution. Water boils at 212° F. and, thus, a temperature of 212° F. will be satisfactory. However, higher temperatures will be used when the absorber is operated under a pressure, for example, of about 40 pounds per square inch. Under these conditions, the stripping temperature in regenerator 20 will be approximately 280° F. Temperatures from about 212° F. up to about 350° F. may be employed, but, of course, the temperature selected will depend largely on the pressure maintained on the regenerator.

The nature and objects of the present invention, having been fully described and illustrated, what I wish to claim as new and useful and to secure by Letters Patent is:

1. A method of removing acid gases from hydrocarbon gas containing them which comprises contacting said acid-containing hydrocarbon gas with an aqueous solution of an ethanol amine in admixture with a small amount of an aromatic hydrocarbon boiling in the range from 175° to 600° F., separating hydrocarbon gas substantially free of acidic constituents from said aqueous solution and recovering same, withdrawing aqueous solution in admixture with aromatic hydrocarbon, separating said aromatic hydrocarbon from said aqueous solution, heating said separated solution to remove acidic gases therefrom, cooling said heated aqueous solution, and returning it to contact additional amounts of said acid-containing hydrocarbon gas.

2. A method for treating an aqueous solution of an ethanol amine which has been contacted in an iron vessel with an acidic hydrocarbon distillate containing hydrogen sulfide and carbon dioxide and which has been contaminated by said contact with organic salts, polymers, inorganic metal compounds, and carbonaceous materials which stabilize emulsions which comprises contacting said contaminated aqueous solution with an aromatic hydrocarbon boiling in the range from 175° to 600° F. under conditions to cause substantial removal of said contaminants, separating aromatic hydrocarbon containing dissolved contaminants from said aqueous solution, and contacting said separated aqueous solution with an acid-containing hydrocarbon distillate to remove acidic constituents therefrom.

3. A method for removing acid gases from hydrocarbon gas containing them which comprises contacting an acid-containing gas with an aqueous solution of an ethanol amine under conditions to remove substantially all of the acid gases from said hydrocarbon gas until said solution loses its efficiency to remove said acid gases from said hydrocarbon gas, discontinuing contact of said acid-containing hydrocarbon gas with said solution, contacting said solution, which has lost its efficiency to remove acid gases from hydrocarbon gas containing them, with approximately 20% by volume based on the ethanol amine of an aromatic hydrocarbon boiling in the range from 175° to 600° F. to remove constituents from said solution which impairs its efficiency, separating aromatic hydrocarbon from said aqueous solution, withdrawing said separated aromatic hydrocarbon, and contacting said treated aqueous solution with an acid-containing hydrocarbon gas to remove acidic bodies therefrom.

4. A method for treating an aqueous solution of an ethanolamine which has been contacted in an iron vessel with an acidic hydrocarbon distillate containing hydrogen sulfide and carbon dioxide and which has been contaminated by said contact with organic salts, polymers, inorganic metal compounds, and carbonaceous materials which stabilizes emulsions which comprises contacting said contaminated aqueous solution with approximately 20% by volume based on the ethanol amine solution a low boiling aromatic hydrocarbon under conditions to cause substantial removal of said organic and inorganic constituents contaminating said solution, separating aromatic hydrocarbon containing dissolved contaminants from said aqueous solution, and contacting said separated aqueous solution with an acid-containing hydrocarbon distillate to remove acidic constituents therefrom.

5. A method in accordance with claim 4 in which the ethanolamine is a monoethanolamine.

6. A method in accordance with claim 4 in which the ethanolamine is a diethanolamine.

7. A method in accordance with claim 4 in which the ethanolamine is a triethanolamine.

8. A method for treating an aqueous solution comprising an ethanolamine which has been contacted in an iron vessel with an acidic hydrocarbon distillate containing hydrogen sulfide and carbon dioxide and which has been contaminated by said contact with organic salts, polymers, inorganic metal compounds, and carbonaceous materials which stabilizes emulsions which comprises contacting said contaminated aqueous solution of ethanolamine with an aromatic-containing hydrocarbon boiling in the gasoline boiling range under conditions to cause substantial removal of said contaminants, separating aromatic-containing hydrocarbon containing dissolved contaminants from said aqueous solution, contacting said separated aqueous solution with an acid-containing hydrocarbon distillate to remove acidic constituents therefrom, separating hydrocarbon distillate substantially free of acidic constituents from said treated aqueous solution, heating said treated aqueous solution under conditions to generate steam and to remove acidic gases therefrom, cooling said heated solution, contacting said cooled solution with additional quantities of acid-containing hydrocarbon distillate and continuing the process until said aqueous solution becomes contaminated again with said organic and inorganic compounds which stabilizes emulsions, and repeating the process.

JOHN H. McCULLEY.

(References on following page)

REFERENCES CITED

The following references are of record in the file of this patent:

UNITED STATES PATENTS

| Number | Name | Date |
|---|---|---|
| Re. 18,958 | Bottoms | Sept. 26, 1933 |
| 2,031,632 | Bottoms | Feb. 25, 1936 |
| 2,104,803 | Henke | Jan. 11, 1938 |
| 2,152,720 | Yabroff | Apr. 4, 1939 |
| 2,220,138 | Wood | Nov. 5, 1940 |
| 2,238,201 | Wilson et al. | Apr. 15, 1941 |
| 2,383,416 | Reed | Aug. 21, 1945 |
| 2,418,047 | Parkes et al. | Mar. 25, 1947 |

OTHER REFERENCES

Blatt, "Organic Synthesis" (John Wiley, Inc., New York, 1943), vol. II, pages 183, 184.